United States Patent
Spann et al.

(10) Patent No.: US 11,091,293 B2
(45) Date of Patent: Aug. 17, 2021

(54) MOLDED CONTAINER ASSEMBLY CONNECTION SYSTEM

(71) Applicant: SNYDER INDUSTRIES, LLC, Lincoln, NE (US)

(72) Inventors: Herbert H. Spann, Lincoln, NE (US); Darrell A. Oltman, Lincoln, NE (US); Colin James Suiter, Lincoln, NE (US)

(73) Assignee: SNYDER INDUSTRIES, LLC, Lincoln, NE (US)

( * ) Notice: Subject to any disclaimer, the term of this patent is extended or adjusted under 35 U.S.C. 154(b) by 162 days.

(21) Appl. No.: 16/377,719

(22) Filed: Apr. 8, 2019

(65) Prior Publication Data

US 2020/0317400 A1 Oct. 8, 2020

(51) Int. Cl.
*F16B 5/02* (2006.01)
*B65D 19/38* (2006.01)
*B65D 71/00* (2006.01)

(52) U.S. Cl.
CPC ....... *B65D 19/385* (2013.01); *B65D 71/0096* (2013.01); *F16B 5/02* (2013.01); *B65D 2519/0097* (2013.01)

(58) Field of Classification Search
CPC .......... F16B 5/0004; F16B 5/02; F16B 5/025; F16B 33/00; F16B 39/10; F16B 39/24; F16B 43/00; F16B 43/007
USPC ................... 411/366.1, 368, 371.2, 383, 539
See application file for complete search history.

(56) References Cited

U.S. PATENT DOCUMENTS

| | | | | |
|---|---|---|---|---|
| 2,525,217 A | * | 10/1950 | Glitsch | F16B 5/0642 292/256.73 |
| 3,006,443 A | * | 10/1961 | Siler | F16B 43/00 403/408.1 |
| 3,305,995 A | * | 2/1967 | Glover | F16B 5/02 52/512 |
| 3,986,318 A | * | 10/1976 | McConnell | F16B 12/34 403/384 |
| 4,106,876 A | * | 8/1978 | Tregoning | E05D 15/0634 403/4 |
| 4,877,364 A | * | 10/1989 | Sorrentino | F16B 5/0275 411/337 |
| 5,716,154 A | * | 2/1998 | Miller | B60R 11/00 403/22 |
| 5,749,669 A | * | 5/1998 | Ketteler | F16B 5/02 403/12 |

(Continued)

*Primary Examiner* — Roberta S Delisle
(74) *Attorney, Agent, or Firm* — Hovey Williams LLP

(57) ABSTRACT

A molded container assembly including a pallet, a molded container, and a plurality of connection systems. The pallet supports the molded container thereon and includes stacking alignment structure for stacking the pallet on another molded container assembly. The molded container includes a tank portion, several leg supports, and several buttresses. The tank portion includes several curved sidewalls and a fill opening. The leg supports include lower sections and upper sections that extend above the fill opening for spacing a pallet stacked on top of the molded container above the fill opening. The upper sections include pallet engaging structure for engaging pallets of at least two different types. The buttresses extend between the tank portion and the leg supports. The connection systems include washers that allow for shrinkage and expansion between the molded container and the pallet in a number of directions.

20 Claims, 11 Drawing Sheets

(56) References Cited

U.S. PATENT DOCUMENTS

| | | | |
|---|---|---|---|
| 7,857,565 B2* | 12/2010 | Martinson | F16B 43/00 411/136 |
| 2011/0194910 A1* | 8/2011 | Lin | G06F 1/187 411/172 |
| 2013/0061453 A1* | 3/2013 | Rosendahl | E04H 12/2261 29/525.11 |
| 2015/0110577 A1* | 4/2015 | Hahner | F16B 43/00 411/531 |

\* cited by examiner

MOLDED CONTAINER ASSEMBLY CONNECTION SYSTEM

BACKGROUND

Intermediate bulk containers (IBCs) are often used for storing, transporting, and dispensing chemicals, petroleum products, and other liquids and typically include a molded tank in a metal reinforcement cage supported on a pallet. A typical molded tank is substantially cuboid, making access to fill openings and outlets difficult, particularly when another IBC is stacked on top of the molded tank. Furthermore, even with support of the metal reinforcement cage, the cuboid shaped molded tank undergoes warping and deformation due to uneven stresses from enclosed liquids. Deformation near the fill openings often causes the molded tank to leak and crack, resulting in liquid loss and sometimes hazardous spills.

In light of the above deficiencies, molded tanks of many IBCs are typically used once and then discarded or replaced. This produces waste and is inefficient because the molded tank has to be removed from the metal support cage and sent to a recycling or waste facility. A new molded tank then has to be purchased, obtained, and installed in the metal support cage.

It is also difficult to stack conventional IBCs because the metal cages can become warped or bent. The metal cages may also rust or corrode, making stacked IBCs a collapsing hazard.

SUMMARY

The present invention solves the above-described problems and other related problems and limitations and provides a distinct advance in liquid storage containers. More particularly, the invention provides a reusable, cageless molded container assembly that is easier to access, can be stacked with several different types of container assemblies, and more effectively mitigates negative effects of liquid and stacking induced stresses and container-pallet shrinkage.

An embodiment of the molded container assembly broadly comprises a pallet, a molded container, and a plurality of connection systems for securing the molded container on the pallet.

An embodiment of the pallet includes an upper deck, a lower deck, opposing front and rear sides opposing left and right sides, two sets of lift channels, connection system engagement structure for receiving components of the connection systems, and stacking alignment structure for stacking the pallet on other molded containers.

An embodiment of the molded container broadly comprises a tank portion, a plurality of leg supports, a plurality of buttresses, a lid, and a spigot. The molded container may be formed via rotational molding, blow molding, or the like and may include embedded components such as metal connection nuts for anchoring components of the connection systems.

The tank portion includes opposing top and bottom walls, opposing front and rear sidewalls, and opposing left and right sidewalls forming an internal chamber. The tank portion also includes a fill opening and a bottom outlet.

The top wall includes a central region having lid connection geometry and lid isolation geometry. The lid connection geometry encircles the fill opening and may include helical threads, locking geometry, and the like. The lid isolation geometry encircles the lid connection geometry and creates a buffer between the lid connection geometry and the buttresses. The lid isolation geometry may be a substantially flat region forming an uninterrupted, homogenous circle around the lid connection geometry. This ensures that a seal formed between the lid and the lid connection geometry is evenly stressed. The bottom wall is the bottom-most region of the tank portion. Portions of the bottom wall may have a generally convex curvature.

The front sidewall faces forward between the front leg supports and may have a slightly convex curvature in a horizontal direction and substantially no curvature in a vertical direction. The rear sidewall faces rearward between the rear leg supports opposite the front sidewall and may have a slightly convex curvature in a horizontal direction and substantially no curvature in a vertical direction.

The left sidewalls extend from the bottom wall to the central region of the top wall between the left leg supports. In one embodiment, the left sidewalls have little to no curvature in a horizontal direction and an uninterrupted, convex, arcuate curvature of a single radius in a vertical direction.

The right sidewalls extend from the bottom wall to the central region of the top wall between the right leg supports. In one embodiment, the right sidewalls have little to no curvature in a horizontal direction and an uninterrupted, convex, arcuate curvature of a single radius in a vertical direction.

The fill opening is positioned in the central region of the top wall and is surrounded by the lid connection geometry. The bottom outlet is positioned at a bottommost point of the bottom wall near the front sidewall and may serve as a fluid dispensing point or drain.

The leg supports include left and right front leg supports, left and right middle leg supports, and left and right rear leg supports. The leg supports are substantially similar so only the left front leg support will be described.

The left front leg support includes a lower section and an upper section and is a generally vertically extending support structure. The lower section extends downward from a vertical midsection (or similar location) of the molded container such that the lower section can be positioned on the upper deck of the pallet.

The upper section extends upward from the midpoint (or a similar location) of the molded container such that an uppermost portion of the upper section is spaced above the top wall, the fill opening, and the lid connection geometry. The upper section includes pallet engagement structure for interfacing or aligning with corresponding features on the lower deck of another pallet or another type of container assembly stacked on top of the molded container. The pallet engagement structure includes first engagement protrusions and a second engagement protrusion. The first engagement protrusions may be nubs, ridges, or other similar features for engaging corresponding features on the lower deck of another pallet similar to pallet. The second engagement protrusion may be a curved ridge or similar feature for engaging a corresponding curved feature on the lower deck of a conventional IBC pallet. In one embodiment, the upper sections of the middle leg supports do not have pallet engagement structure.

The buttresses project from the tank portion to the leg supports for increasing rigidity of the molded container. The buttresses include lower buttresses and upper buttresses. The lower buttresses include left and right front buttresses, left and right middle buttresses, and left and right rear buttresses. The lower buttresses are substantially similar and thus only the left front lower buttress will be described. The left front lower buttress projects from a central portion of the bottom wall to the lower section of the leg support, thereby partitioning the bottom wall and the front sidewall from the left sidewall. A bottom of the left front lower buttress may be substantially flat and level with the bottom of the lower section of the leg support so as to form a continuous footprint therewith.

The upper buttresses include left and right front buttresses, left and right middle buttresses, and left and right rear buttresses. The upper buttresses are substantially similar and thus only the left front upper buttress will be described in detail. The left front upper buttress projects from the central region of the top wall to the upper section of the leg support, thereby partitioning the top wall and the front sidewall from the left sidewall. To that end, the left front upper buttress may have an upward sloping face. The upper buttresses provide increased strength around the central region of the top wall.

The connection systems secure the molded container to the pallet via the lower sections of the leg supports. Each connection system broadly comprises a fastener, a quadrant washer, and an eccentric washer. In some embodiments, other or additional washers such as flat washers, lock washers, and the like may be used.

The fastener includes opposing first and second ends and extends through an opening or hole in the pallet such that the first end is secured in the fastener anchor of the lower section of one of the leg supports. The fastener may include helical threading and may be a bolt or similar component.

The quadrant washer is received within the connection system engagement structure of the pallet and may be a rectangular plate or any other suitable shape including a through-hole having a complex shape. The through-hole is configured to receive the fastener therethrough in a nominal position and to allow the fastener to shift in a plurality of directions from the nominal position due to expansion or contraction of the molded container or the pallet. In one embodiment, the through-hole may have a "cockle shell" shape.

The eccentric washer is adjacent the quadrant washer and may be a circular disc with an offset through-hole. The offset through-hole is configured to receive the fastener therethrough in alignment with the through-hole of the quadrant washer. The offset through-hole may be small enough to receive only a portion of the fastener therethrough. For example, the offset through-hole may be able to receive a shank and/or threaded portion of a bolt but not the bolt's head therethrough. In another embodiment, a nut or other connector may be used to prevent the fastener from passing through the offset through-hole.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
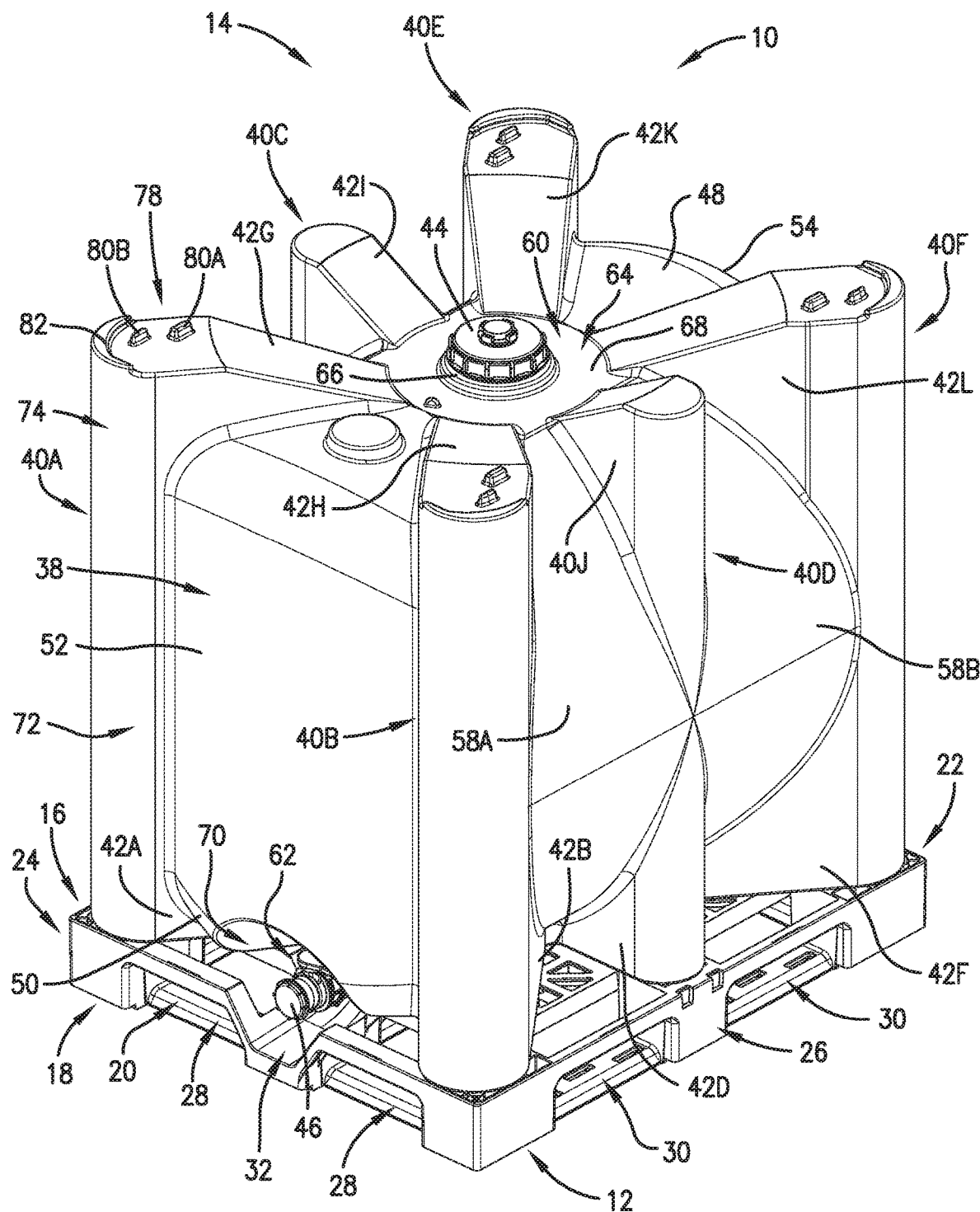
FIG. 1 is a top perspective view of a molded container assembly constructed in accordance with an embodiment of the invention.
Figure 2:
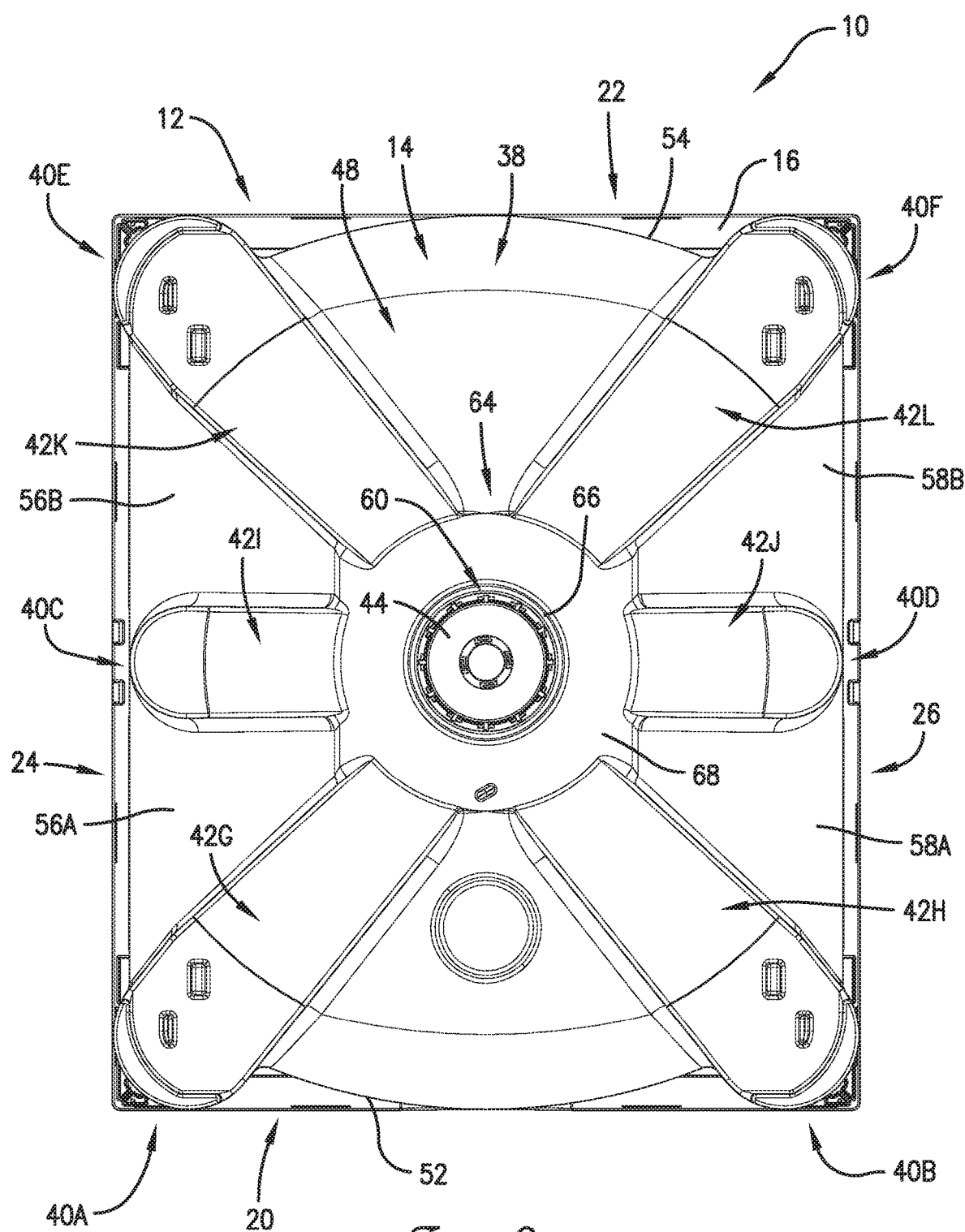
FIG. 2 is a top plan view of the molded container assembly of FIG. 1.
Figure 3:
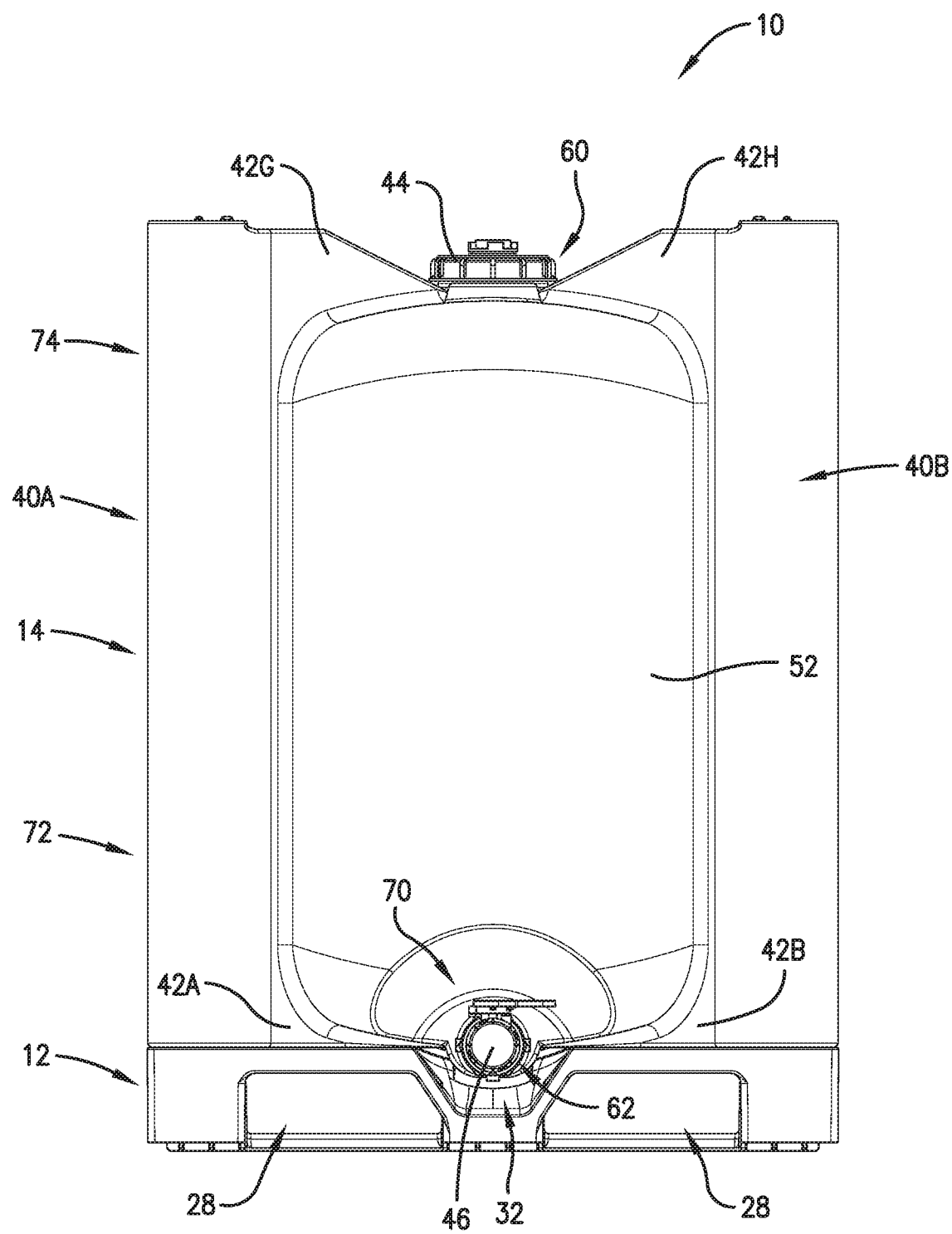
FIG. 3 is a front elevation view of the molded container assembly of FIG. 1.
Figure 4:
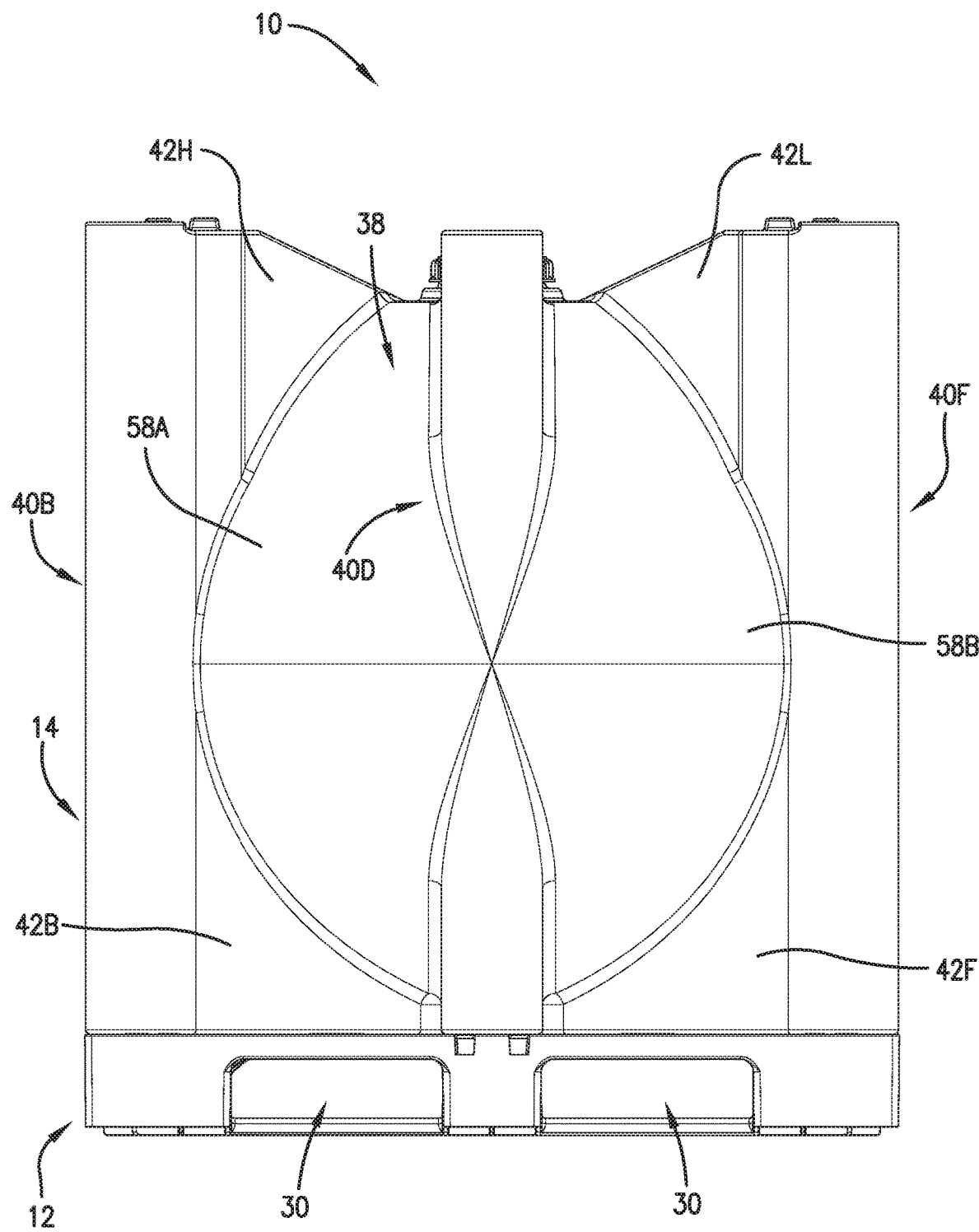
FIG. 4 is a side elevation view of the molded container assembly of FIG. 1.
Figure 5:
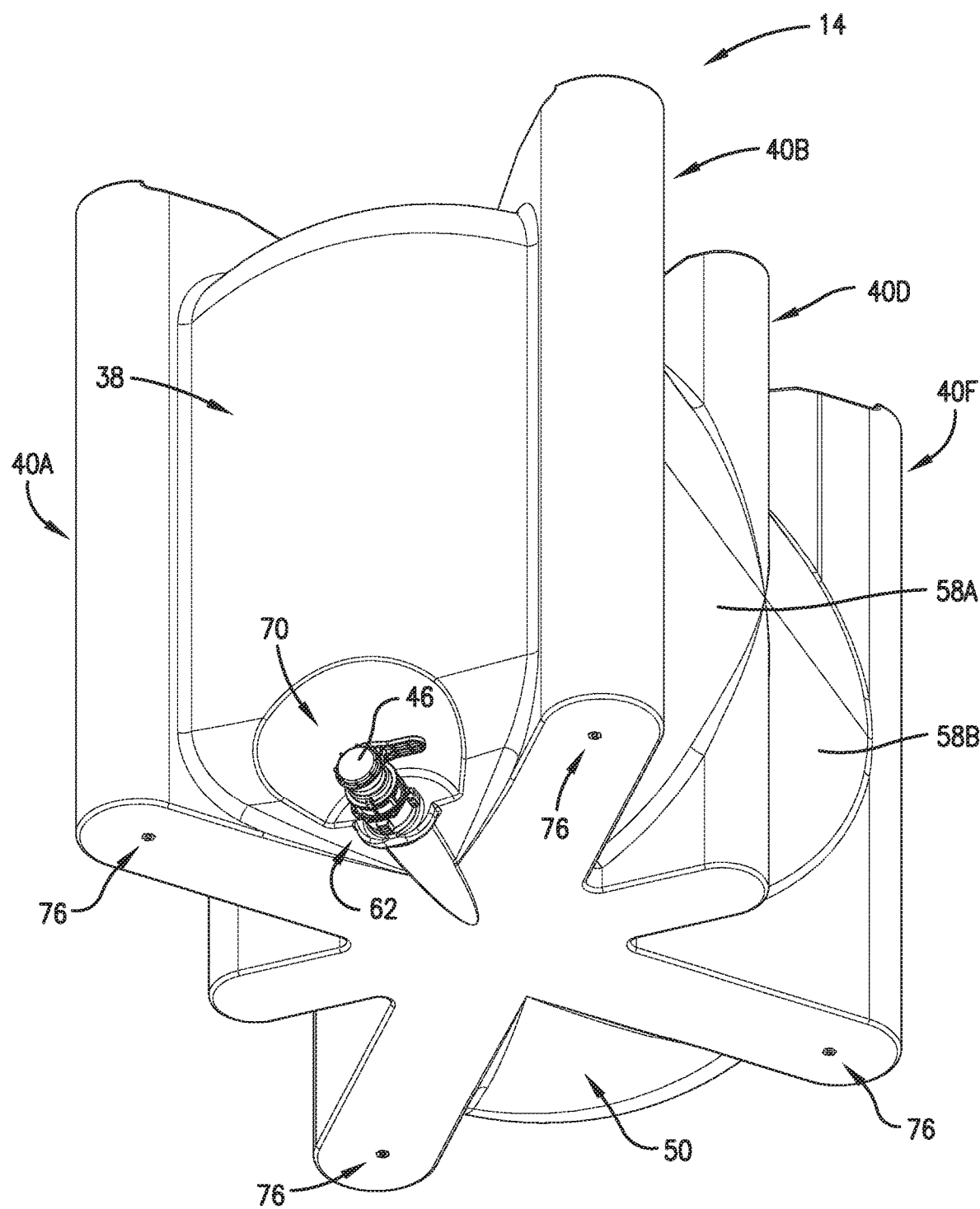
FIG. 5 is a bottom perspective view of the molded container of FIG. 1.
Figure 6:
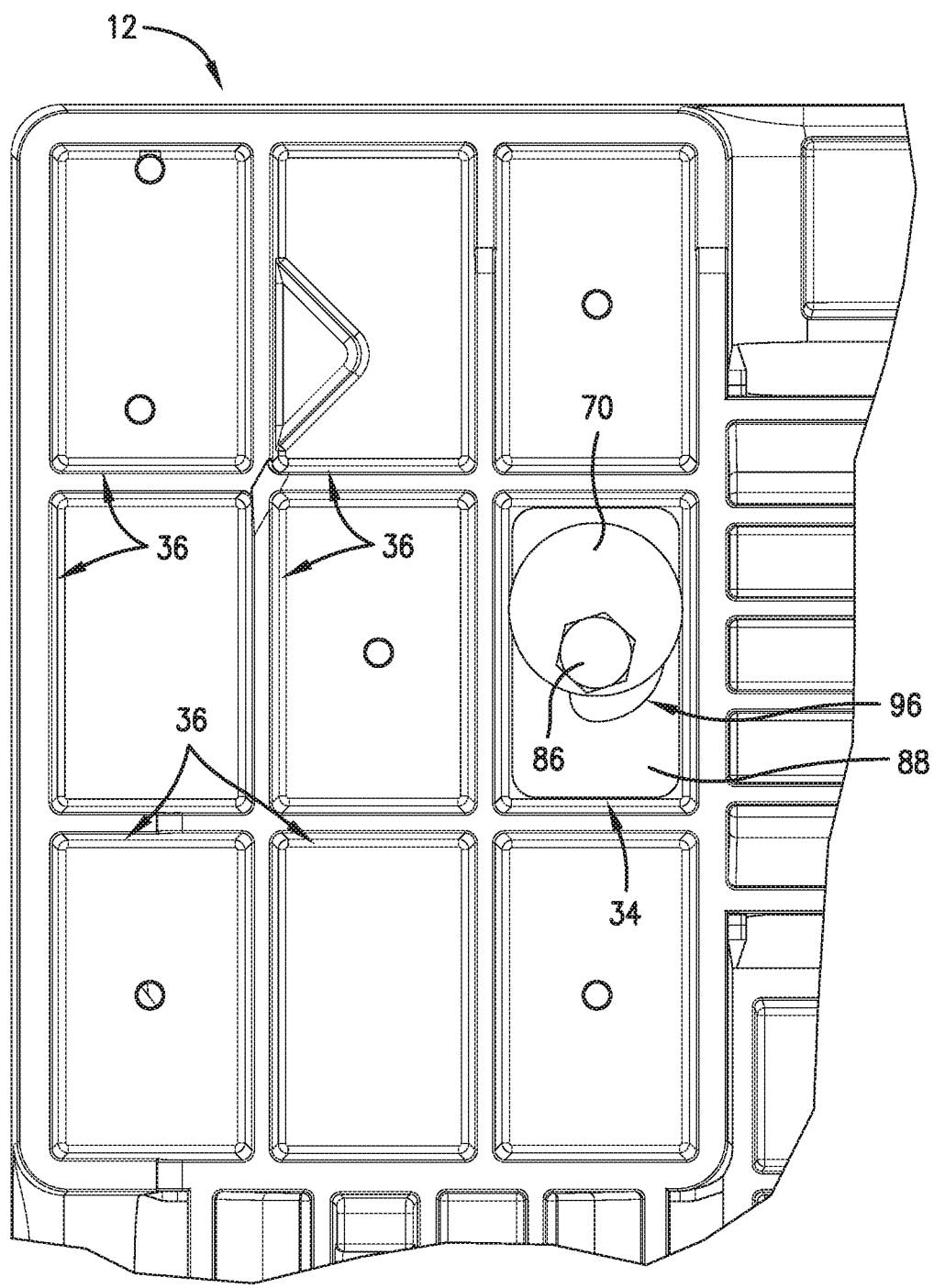
FIG. 6 is a bottom plan view of a connection system of the molded container assembly of FIG. 1.
Figure 7:
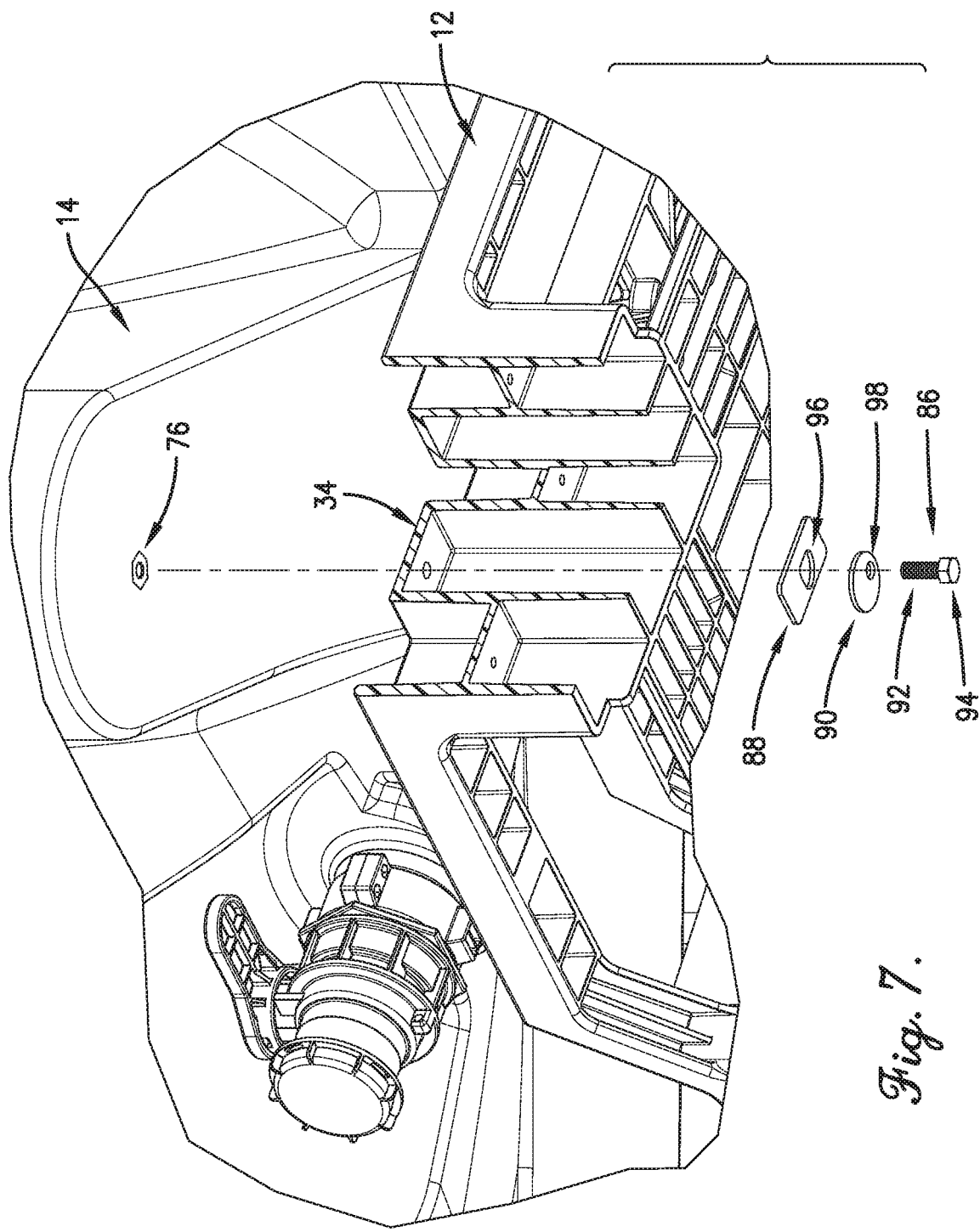
FIG. 7 is an exploded perspective view of the connection system of FIG. 6.
Figure 8:
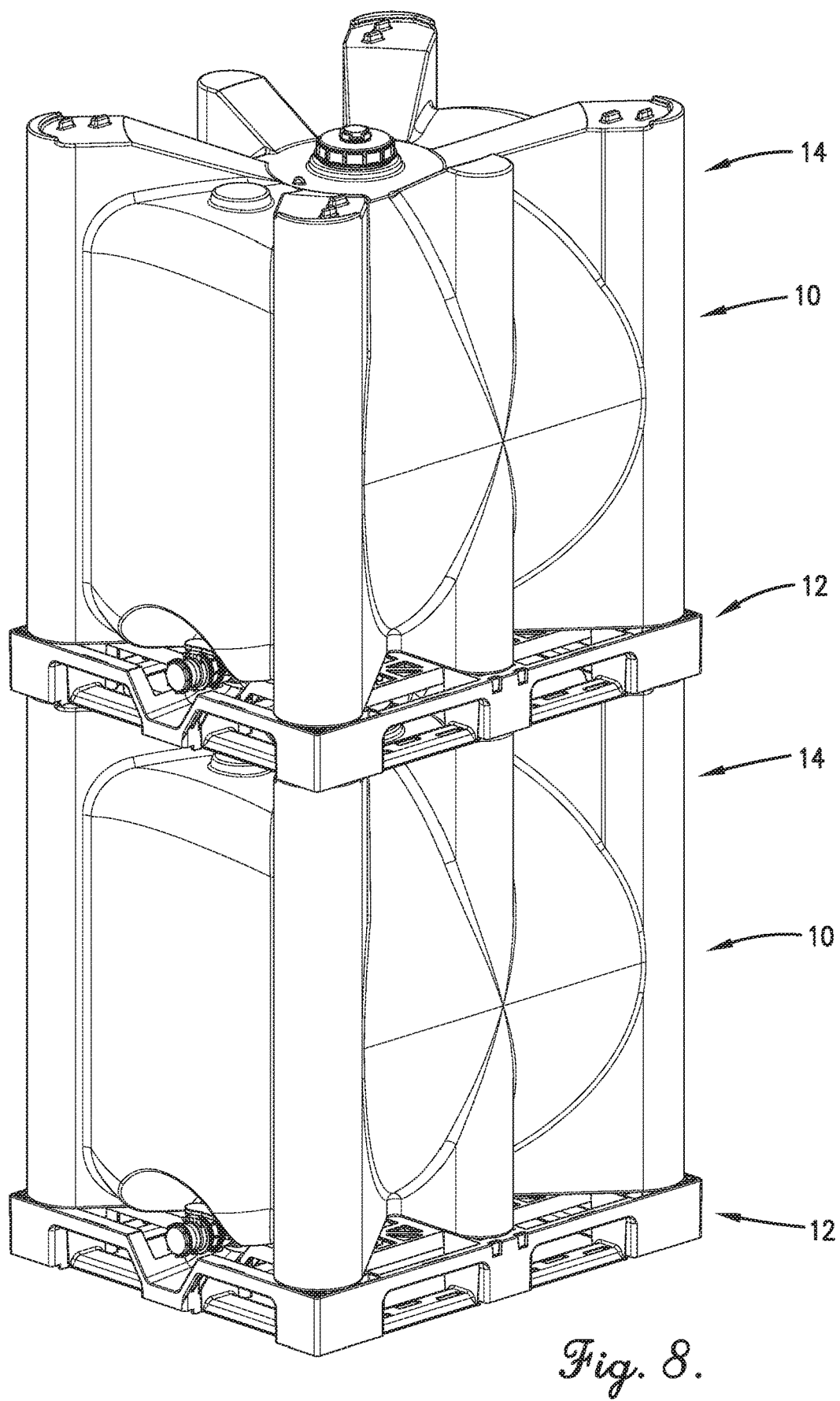
FIG. 8 is a top perspective view of two molded container assemblies stacked on top each other in accordance with an embodiment of the invention.
Figure 9:
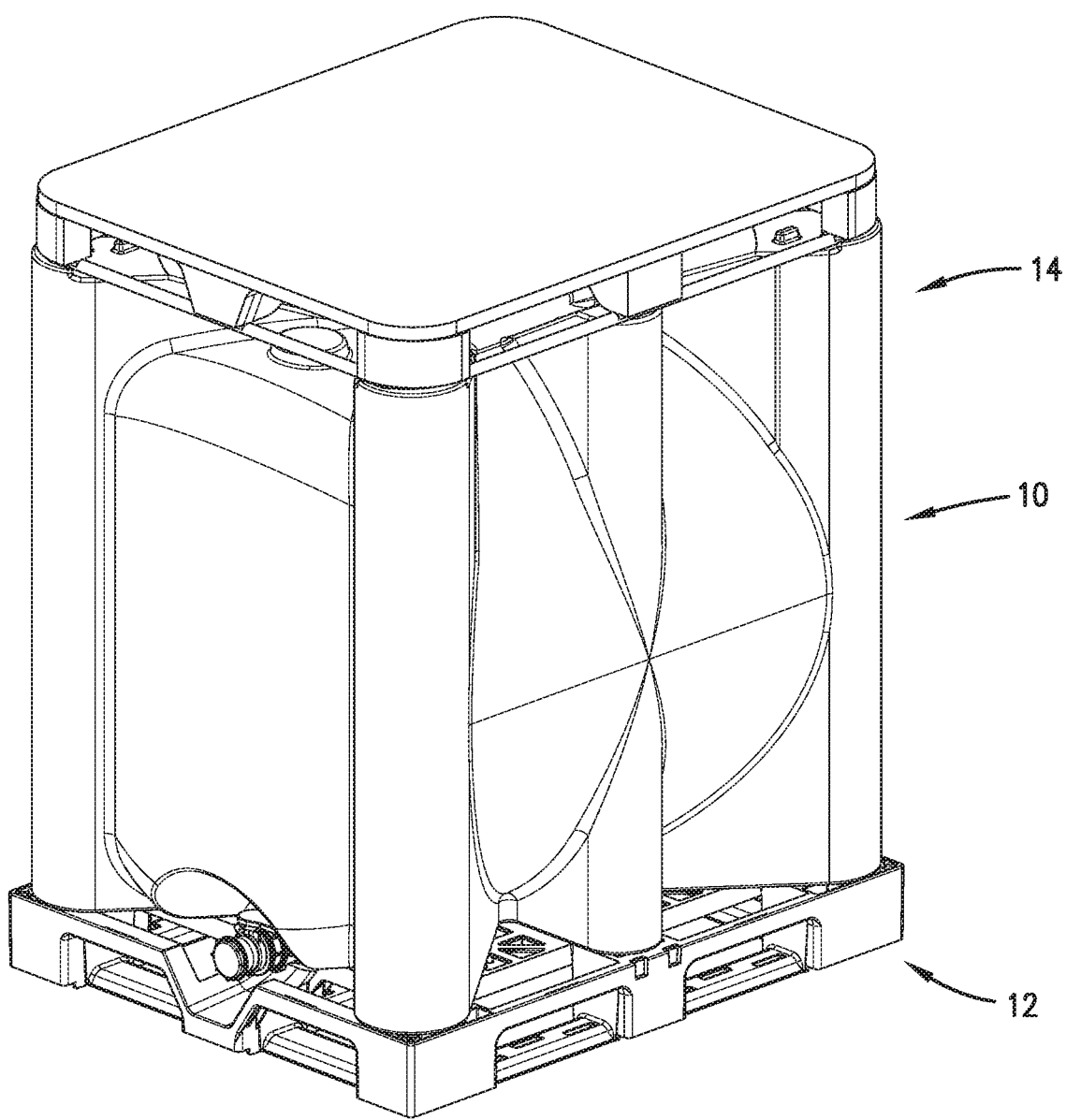
FIG. 9 is a top perspective view of a conventional pallet stacked on top of the molded container assembly of FIG. 1 in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the claims of a subsequent patent, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to FIGS. 1-9, a molded container assembly 10 constructed in accordance with an embodiment of the invention is illustrated. The molded container assembly 10 broadly comprises a pallet 12, a molded container 14, and a plurality of connection systems for securing the molded container 14 on the pallet 12. An embodiment of the molded container assembly 10 may have a length of 48 inches and a width of 40 inches or any other suitable footprint.

The pallet 12 includes an upper deck 16, a lower deck 18, opposing front and rear sides 20, 22, opposing left and right sides 24, 26, a first set of lift channels 28, a second set of lift channels 30, an outlet recess 32, connection system engagement structure 34, and stacking alignment structure 36.

The upper deck 16 may include a plurality of trusses, cross members, braces, and other structural features and several openings, through-holes, or voids to maximize a strength-to-weight ratio of the pallet 12. The upper deck 16 may have a substantially flat surface or face for supporting the molded container 14 thereon.

The lower deck 18 may include a plurality of trusses, cross members, braces, and other structural features, and several openings, through-holes, or voids to maximize a strength-to-weight ratio of the pallet 12. The lower deck 18 may have a substantially flat surface or face for generally resting on a flat surface.

The front side 20 may be an orthogonal forward-facing wall or structure. The front side 20 may be configured to abut sides of other pallets so that the molded container assembly 10 can be compactly stored side-by-side with other molded container assemblies.

The rear side 22 may be an orthogonal rear-facing wall or structure similar to the front side 20. The rear side 22 may be configured to abut sides of other pallets so that molded container assembly 10 can be compactly stored side-by-side with other molded container assemblies.

The left side 24 may be an orthogonal side-facing wall or structure. The left side 24 may be configured to abut sides of other pallets so that the molded container assembly 10 can be compactly stored side-by-side with other molded container assemblies.

The right side 26 may be an orthogonal side-facing wall or structure opposite the left side 24. The right side 26 may be configured to abut sides of other pallets so that the molded container assembly 10 can be compactly stored side-by-side with other molded container assemblies.

The first set of lift channels 28 extend from the front side 20 to the rear side 22 for receiving lifting forks of a forklift, pallet jack, hand jack, or other lifting device. The first set of lift channels 28 may extend fully from the front side 20 and the rear side 22 such that lifting forks may be inserted through the pallet 12.

The second set of lift channels 30 extend from the left side 24 to the right side 26 for receiving lifting forks of a forklift, pallet jack, hand jack, or other lifting device. The second set of lift channels 30 may extend fully from the left side 24 and the right side 26 such that lifting forks may be inserted through the pallet 12. The first set of lift channels 28 and the second set of lift channels 30 may intersect with each other such that lifting forks can be inserted through either set but not at the same time. Alternatively, one set of lift channels may extend above or below the other set of lift channels.

The outlet recess 32 extends into the upper deck 16 near the front side 20 for receiving a bottom outlet and a spigot of the molded container 14. The outlet recess 32 may be centered between the left side 24 and the right side 26.

The connection system engagement structure 34 may be rectangular recesses, cavities, pockets, or the like and may be accessible from the lower deck 18. The connection system engagement structure 34 is configured to receive or align with components of the connection systems.

The stacking alignment structure 36 may be rectangular recesses, cavities, pockets, or the like and may be accessible from the lower deck 18. The stacking alignment structure 36 is configured to engage pallet engagement structure of a molded container on which the molded container assembly 10 may be stacked.

The molded container 14 includes a tank portion 38, a plurality of leg supports 40A-F, a plurality of buttresses 42A-L, a lid 44, and a spigot 46. The molded container 14 may be formed via rotational molding or the like and may include embedded components such as metal connection nuts.

The tank portion 38 includes opposing top and bottom walls 48, 50, opposing front and rear sidewalls 52, 54, and opposing left and right sidewalls 56, 58 forming an internal chamber. The tank portion 38 also includes a fill opening 60 and a bottom outlet 62.

The top wall 48 includes a central region 64 having lid connection geometry 66 and lid isolation geometry 68. The lid connection geometry 66 extends around the fill opening 60 and may include helical threads, locking geometry, and the like. The lid isolation geometry 68 extends around the lid connection geometry 66 and creates a buffer between the lid connection geometry 66 and the buttresses 42A-F. The lid isolation geometry 68 may be a substantially flat region forming an uninterrupted, homogenous circle around the lid connection geometry 66. This ensures that a seal formed between the lid 44 and the lid connection geometry 66 is evenly stressed. Meanwhile, other portions of the top wall 48 may have a generally convex curvature.

The bottom wall 50 is the bottom-most region of the tank portion 38. Portions of the bottom wall 50 may have a generally convex curvature.

The front sidewall 52 faces forward between the leg supports 40A,B and may have a slightly convex curvature in a horizontal direction and substantially no curvature in a vertical direction. The front sidewall 52 may also have a bottom outlet recess 32 for accommodating the bottom outlet 62 and the spigot 46.

The rear sidewall 54 faces rearward between the leg supports 40E,F opposite the front sidewall 52 and may have a slightly convex curvature in a horizontal direction and substantially no curvature in a vertical direction. The rear sidewall 54 may be substantially identical to the front sidewall 52 but without a bottom outlet recess.

The left sidewalls 56A,B extend from the bottom wall 50 to the central region 64 of the top wall 48 between the leg supports 40A,C and 40C,E. The left sidewall 56A has little to no curvature in a horizontal direction and an uninterrupted, convex, arcuate curvature in a vertical direction. The vertical curvature may have a single radius or may be complex. The curvature limits deflection during use. The left sidewall 56B is substantially similar to the left sidewall 56A and thus will not be described.

The right sidewalls 58A,B extend from the bottom wall 50 to the central region 64 of the top wall 48 between the leg supports 40B,D and 40D,F. The right sidewall 58A has little to no curvature in a horizontal direction and an uninterrupted, convex, arcuate curvature in a vertical direction. The vertical curvature may have a single radius or may be complex. The right sidewall 58B is substantially similar to the right sidewall 58A and thus will not be described.

The fill opening 60 may be positioned in the central region 64 of the top wall 48 and is surrounded by the lid connection geometry 66. The fill opening 60 may be closed or covered by the lid 44 as explained below.

The bottom outlet 62 may be positioned at a bottommost point of the bottom wall 50 near the front sidewall 52. The bottom outlet 62 may serve as a fluid dispensing point or drain.

The leg supports 40A-F include left and right front leg supports 40A,B, left and right middle leg supports 40C,D, and left and right rear leg supports 40E,F. The leg supports 40A-F are substantially similar so only left front leg support 40A will be described in detail.

The left front leg support 40A includes a lower section 72 and an upper section 74 and is a generally vertically extending support structure. The left front leg support 40A may include fluid volume markings or other suitable markings (shown on the right front leg support 40B in this embodiment).

The lower section 72 extends downward from a vertical midsection (or similar location) of the molded container 14 such that the lower section 72 can be positioned on the upper deck 16 of the pallet 12. In one embodiment, the bottommost portion of the lower section 72 includes a fastener anchor 76 and is level with at least some regions of the bottom wall 50 of the tank portion 38. The fastener anchor 76 receives a fastener of one of the connection systems therein, as explained in more detail below. The lower section 72 may have a curved outer surface or other features for increased strength.

The upper section 74 extends upward from the midpoint (or a similar location) of the molded container 14 such that an uppermost portion of the upper section 74 is spaced above the top wall 48, the fill opening 60, and the lid connection geometry 66. The upper section 74 includes pallet engagement structure 78 for interfacing or aligning with corresponding features on the lower deck of another pallet or another type of container assembly stacked on top of the molded container 14. The pallet engagement structure 78 includes first engagement protrusions 80A,B and a second engagement protrusion 82. The first engagement protrusions 80A,B may be nubs, ridges, or other similar features for engaging corresponding features on the lower deck of another pallet similar to pallet 12 (see FIG. 8). In one embodiment, the first engagement protrusions 80A,B are spaced diagonally from each other for being received in diagonally spaced stacking alignment structure of the other pallet. The second engagement protrusion 82 may be a curved ridge or similar feature for engaging a corresponding curved feature on the lower deck of a conventional IBC pallet (see FIG. 9). In one embodiment, the upper sections of the middle leg supports 40C,D do not have pallet engagement structure.

The buttresses 42A-L project from the tank portion 38 to the leg supports 40A-F for increasing rigidity of the molded container 14. The buttresses 42A-L include lower buttresses (left and right front buttresses 42A,B, left and right middle buttresses 42C,D, and left and right rear buttresses 42E,F) and upper buttresses (left and right front buttresses 42G,H, left and right middle buttresses 42I,J, and left and right rear buttresses 42K,L). Buttresses 42A-F are substantially similar and thus only buttress 42A will be described. Buttress 42A projects from a central portion of the bottom wall 50 to the lower section 72 of the leg support 40A, thereby partitioning the bottom wall 50 and the front sidewall 52 from the left sidewall 56A. A bottom of buttress 42A may be substantially flat and level with the bottom of the lower section 72 of the leg support 40A so as to form a continuous footprint therewith. The lower buttresses form a radiating star pattern for improved support.

Buttresses 42G-L are substantially similar and thus only buttress 42G will be described in detail. Buttress 42G projects from the central region 64 of the top wall 48 to the upper section 74 of the leg support 40A, thereby partitioning the top wall 48 and the front sidewall 52 from the left sidewall 56A. To that end, buttress 42G may have an upward sloping face. Buttress 42G provides increased strength around the central region 64 of the top wall 48. Buttresses 42G-L reinforce the central region 64 of the top wall 48 while allowing for fill neck isolation, which results in even stresses around the fill opening 60. Buttresses 42G-L protect the lid connection geometry 66 while providing access thereto.

The lid 44 may be a cap, a plug, or the like for covering or sealing the fill opening 60. In one embodiment, the lid 44 includes helical threads for engaging helical threads of the lid connection geometry 66.

The spigot 46 may be a faucet, a valve, a spout, a plug, or the like. The spigot 46 is received in the bottom outlet 62 and governs fluid flow therethrough.

The connection systems secure the molded container 14 to the pallet 12 via the lower sections of the leg supports 40A-F. The connection systems are substantially identical so only connection system 84 will be described. Connection system 84 broadly comprises a fastener 86, a quadrant washer 88, and an eccentric washer 90. In some embodiments, other or additional flat washers, lock washers, or the like may be used.

The fastener 86 includes opposing first and second ends 92, 94 and extends through an opening or hole in the pallet 12 (large enough to allow movement of the fastener 86) such that the first end 92 is secured in the fastener anchor 76 of the lower section 72 of the left front leg support 40A. The fastener 86 may include helical threading and may be a bolt or similar component. In one embodiment, the fastener 86 is a bolt with the second end 94 having a head. In another embodiment, the fastener 86 is a threaded rod.

The quadrant washer 88 fits within the connection system engagement structure 34 of the pallet 12 and may be a rectangular plate or any other suitable shape including a through-hole 96 having a complex shape. The through-hole 96 is configured to receive the fastener 86 therethrough in a nominal position and to allow the fastener 86 to shift in a plurality of directions from the nominal position due to expansion or contraction of the molded container 14 or the pallet 12. In one embodiment, the through-hole 96 may have a "cockle shell" shape (see FIGS. 6 and 7).

The eccentric washer 90 is adjacent the quadrant washer 88 and may be a circular disc with an offset through-hole 98. The offset through-hole 98 is configured to receive the fastener 86 therethrough in alignment with the through-hole 96 of the quadrant washer 88. The offset through-hole 98 may be small enough to receive only a portion of the fastener 86 therethrough. For example, the offset through-hole 98 may be able to receive a shank and/or threaded portion of a bolt but not the bolt's head therethrough. In another embodiment, a nut or other connector may be used to prevent the fastener 86 from passing through the offset through-hole 98.

The above-described molded container assembly 10 provides several advantages. For example, the pallet engagement structure 78 allows pallets of different types to be stacked and aligned on the molded container 14. Specifically, the first engagement protrusions 80 interlock with corresponding stacking alignment structure of a pallet of another molded container assembly (similar to molded container assembly 10). Meanwhile, the second engagement protrusion 82 interlocks with corresponding geometry of a conventional IBC pallet.

The left sidewalls 56A,B and right sidewalls 58A,B of the tank portion 38 have uninterrupted convex curvature, which minimizes stress concentrations and thus maximizes durability, reliability, and longevity. The curvature also provides more access to the pallet 12. The molded container 14 is essentially a union of a storage structure (tank portion 38) and a support structure (leg supports 40A-F and buttresses 42A-L). This union produces a self-supporting IBC, which is optimized for material consumption, volume efficiency, stacking efficiency, durability, and testing performance. The storage structure provides optimal liquid holding volume, drainage, and pressure holding capabilities, while the support structure provides stacking strength and stacking inter-compatibility, "bumper" protection for the storage structure, fill opening 60, and bottom outlet 62. To that end, at least a portion of each leg support 40A-F is outside of a horizontal profile of the tank portion 38. The upper section 74 of each leg support 40A-F extends above the fill opening 60 for spacing a pallet stacked on the molded container 14 above the fill opening 60.

The lid isolation geometry 68 and symmetry of the lid connection geometry 66 in the central region 64 of the top wall 48 of the tank portion 38 ensure that a seal formed between the lid 44 and the lid connection geometry 66 is evenly stressed. This prevents leaking and irreparable damage to the lid connection geometry 66.

The connection systems accommodate relative shrinkage between the molded container 14 and the pallet 12. The quadrant washer 88 can be placed in any one of four orientations to cover all possible relative shrinkages. The connection systems are easy to install and adjust using conventional tools.

Figure 10:
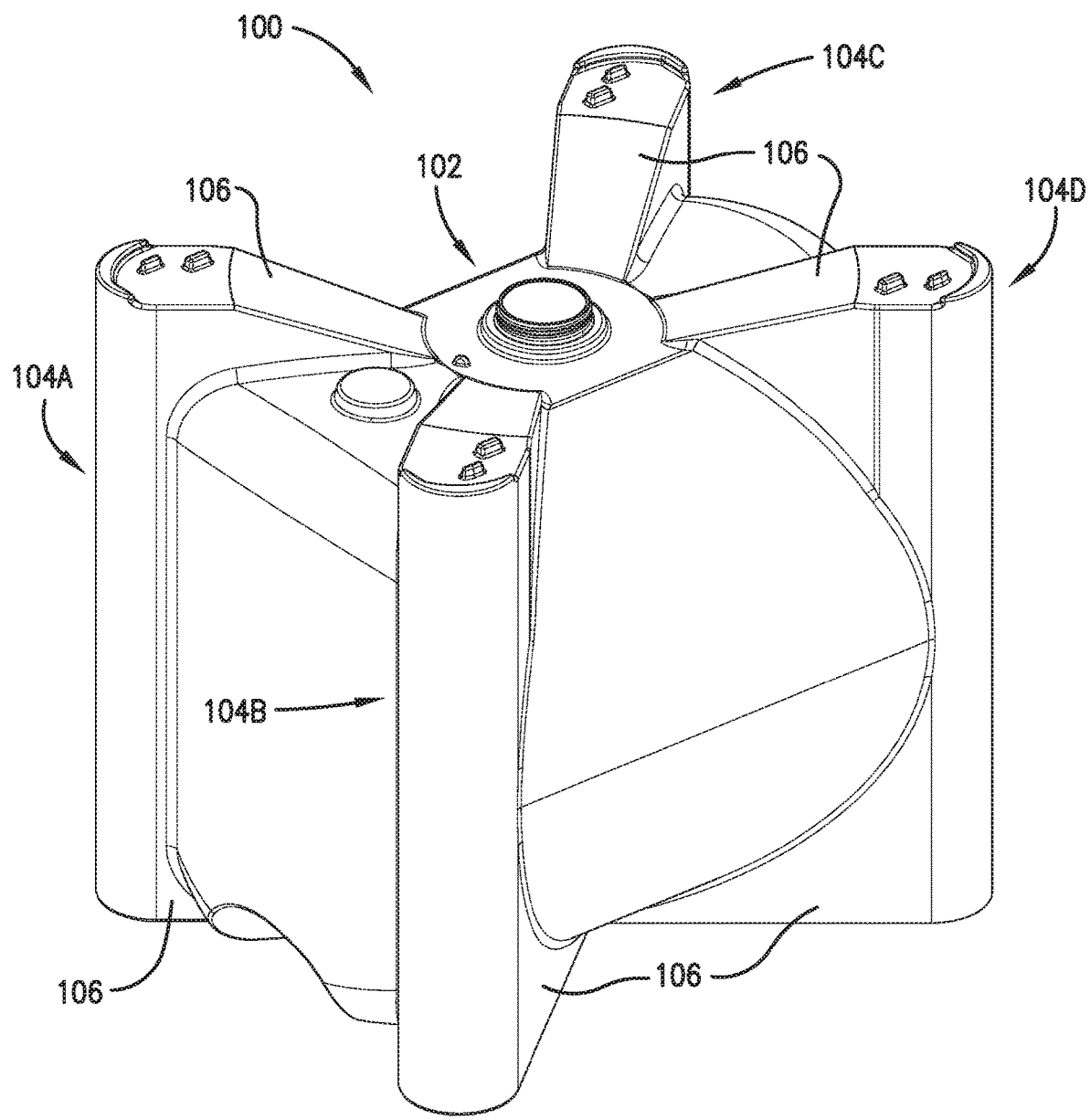
FIG. 10 is a perspective view of a molded container constructed in accordance with another embodiment of the invention.

Turning to FIG. 10, a molded container 100 constructed in accordance with another embodiment of the invention broadly comprises a tank portion 102, a plurality of leg supports 104A-D, and a plurality of buttresses 106. The molded container 100 is substantially similar to the molded container 14 described above except that the leg supports 104A-D only include front and rear corner leg supports and do not include middle leg supports. This provides easier access to the fill opening from a side of the molded container 100.

Figure 11:
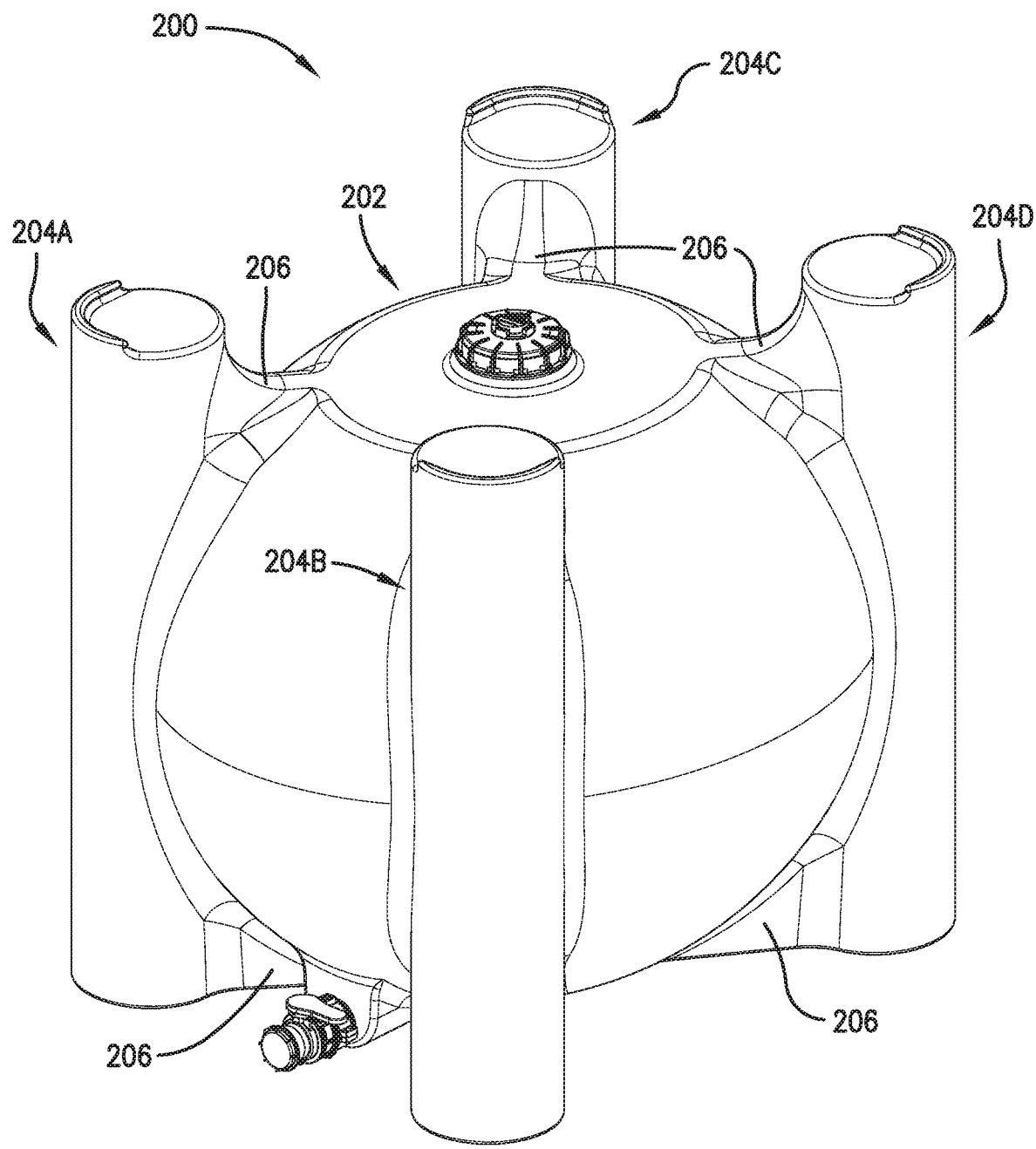
FIG. 11 is a perspective view of a molded container constructed in accordance with another embodiment of the invention.

Turning to FIG. 11, a molded container 200 constructed in accordance with another embodiment of the invention broadly comprises a tank portion 202, a plurality of leg supports 204A-D, and a plurality of buttresses 206. The molded container 200 is substantially similar to the molded containers described above except that the tank portion 202 has an ellipsoid shape. More generally, front and rear sidewalls of the tank portion 202 may have curvature in a vertical direction.

Although the invention has been described with reference to the embodiments illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

1. A connection system for securing a container to a pallet, the connection system comprising:
    a fastener having opposing first and second ends, the first end being configured to be secured to the container;
    a quadrant washer configured to engage connection structure of the pallet, the quadrant washer comprising a through-hole for receiving the fastener therethrough in a nominal position, the through-hole being laterally wider than the fastener in a plurality of directions to allow the fastener to shift laterally in the plurality of directions from the nominal position due to expansion or contraction of at least one of the container and the pallet; and
    an eccentric washer having a through-hole for receiving the fastener therethrough, the through-hole of the eccentric washer being offset from a center of the eccentric washer so that the fastener can shift in the plurality of directions, the through-hole of the eccentric washer being sized so that the second end of the fastener cannot pass longitudinally there-through.

2. The connection system of claim 1, the plurality of directions including all directions in a ninety degree arc.

3. The connection system of claim 1, wherein the quadrant washer is configured to engage the connection structure of the pallet in any one of four orientations.

4. The connection system of claim 3, wherein the quadrant washer is configured to allow the fastener to shift in any direction depending on the orientation of the quadrant washer.

5. The connection system of claim 1, wherein the quadrant washer is rectangular and the eccentric washer is circular.

6. The connection system of claim 1, wherein the fastener is a bolt having a head near the second end.

7. The connection system of claim 1, wherein the through-hole of the quadrant washer has rounded corners.

8. The connection system of claim 1, wherein the through-hole of the quadrant washer has a cockle shell shape.

9. The connection system of claim 1, where in the nominal position is in a center of the quadrant washer.

10. The connection system of claim 1, wherein the quadrant washer and the eccentric washer are flat plates.

11. A connection system for securing a container to a pallet, the connection system comprising:
    a fastener having opposing first and second ends, the first end being configured to be secured to the container;
    a quadrant washer configured to engage connection structure of the pallet, the quadrant washer comprising a through-hole for receiving the fastener therethrough in a nominal position, the through-hole being laterally wider than the fastener in a plurality of directions to allow the fastener to shift laterally in the plurality of directions from the nominal position due to expansion or contraction of at least one of the container and the pallet;
    an eccentric washer having a through-hole for receiving the fastener therethrough, the through-hole of the eccentric washer being offset from a center of the eccentric washer so that the fastener can shift in the plurality of directions; and
    a connector configured to engage the fastener near the second end of the fastener, the through-hole of the eccentric washer being sized so that the connector and hence the second end of the fastener cannot pass longitudinally there-through.

12. The connection system of claim 11, the plurality of directions including all directions in a ninety degree arc.

13. The connection system of claim 11, wherein the quadrant washer is configured to engage the connection structure of the pallet in any one of four orientations.

14. The connection system of claim 13, wherein the quadrant washer is configured to allow the fastener to shift in any direction depending on the orientation of the quadrant washer.

15. The connection system of claim 11, wherein the quadrant washer is rectangular and the eccentric washer is circular.

16. The connection system of claim 11, wherein the fastener is a threaded rod and the connector is a threaded nut.

17. The connection system of claim 11, wherein the through-hole of the quadrant washer has rounded corners.

18. The connection system of claim 11, wherein the through-hole of the quadrant washer has a cockle shell shape.

19. The connection system of claim 11, where in the nominal position is in a center of the quadrant washer.

20. A molded container assembly comprising:
- a bottom pallet having a lower deck, an upper deck, opposing front and rear sides, and opposing left and right sides, the bottom pallet further including connection structure below the upper deck and accessible from the lower deck;
- a molded container positioned on the upper deck of the bottom pallet, the molded container comprising:
  - a tank portion defining therein a fluid storage chamber, the tank portion including a plurality of sidewalls, a bottom wall, a top wall, and a fill opening in the top wall;
  - a plurality of supports extending vertically from the tank portion, each vertically extending support including a lower section and an upper section, the upper sections extending above the fill opening for spacing a pallet stacked on top of the molded container above the fill opening; and
  - a plurality of buttresses projecting from the tank portion to at least one of the lower sections and the upper sections of the vertically extending supports; and
- a connection system for securing the molded container to the pallet, the connection system comprising:
  - a fastener having opposing first and second ends, the first end being configured to be secured to one of the lower sections of the plurality of supports near the first end;
  - a quadrant washer configured to the engage connection structure of the bottom pallet, the quadrant washer comprising a through-hole for receiving the fastener therethrough in a nominal position, the through-hole being laterally wider than the fastener in a plurality of directions to allow the fastener to shift laterally in the plurality of directions from the nominal position due to expansion or contraction of at least one of the molded container and the bottom pallet; and
  - an eccentric washer having a through-hole for receiving the fastener therethrough, the through-hole of the eccentric washer being offset from a center of the eccentric washer so that the fastener can shift in the plurality of directions, the through-hole of the eccentric washer being sized so that the second end of the fastener cannot pass longitudinally there-through.

* * * * *